United States Patent

[11] 3,580,628

| | | |
|---|---|---|
| [72] | Inventor | Charles W. Rantala<br>Warren, Mich. |
| [21] | Appl. No. | 842,129 |
| [22] | Filed | July 16, 1969 |
| [45] | Patented | May 25, 1971 |
| [73] | Assignee | General Motors Corporation<br>Detroit, Mich. |

[54] ROCKER-MOLDING INSTALLATION
4 Claims, 4 Drawing Figs.

[52] U.S. Cl............................................... 296/1,
296/28, 293/62
[51] Int. Cl................................................ B62d 23/22
[50] Field of Search........................................... 296/1, 28;
293/1, 54 (D), 62

[56] References Cited
UNITED STATES PATENTS

| 2,893,776 | 7/1959 | Earl............................. | 296/28X |
| 2,997,329 | 8/1961 | Chapman................... | 296/1 |
| 3,140,891 | 7/1964 | Shreffler...................... | 296/1 |

*Primary Examiner*—Philip Goodman
*Attorneys*—Paul Fitzpatrick and Jean L. Carpenter ABSTRACT: An arrangement for securing a rocker molding to an automobile rocker panel notwithstanding the presence of a body panel lower molding immediately above the rocker panel. The rocker molding hooks over clips which may move vertically on the rocker panel and the ultimate location vertically of the rocker panel is fixed by screws entering the bottom of the rocker panel through a flange on the molding.

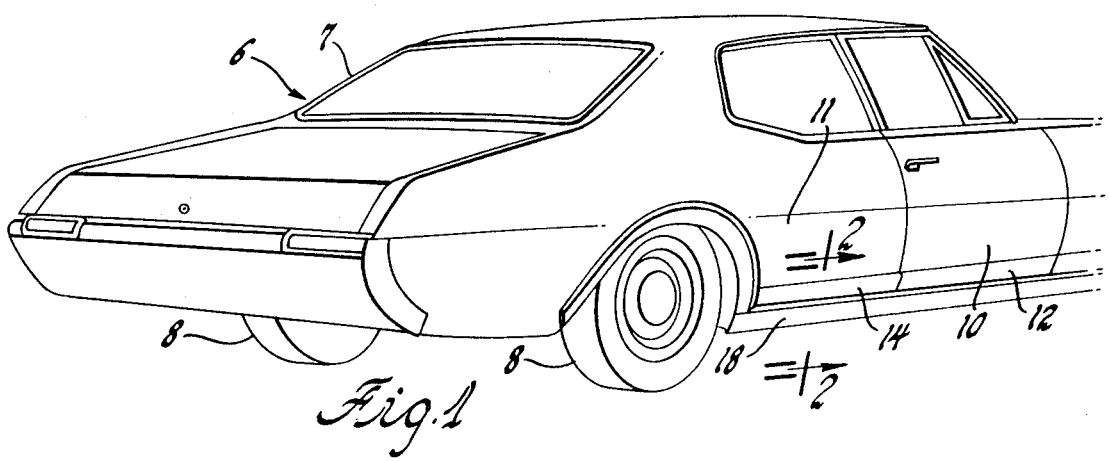
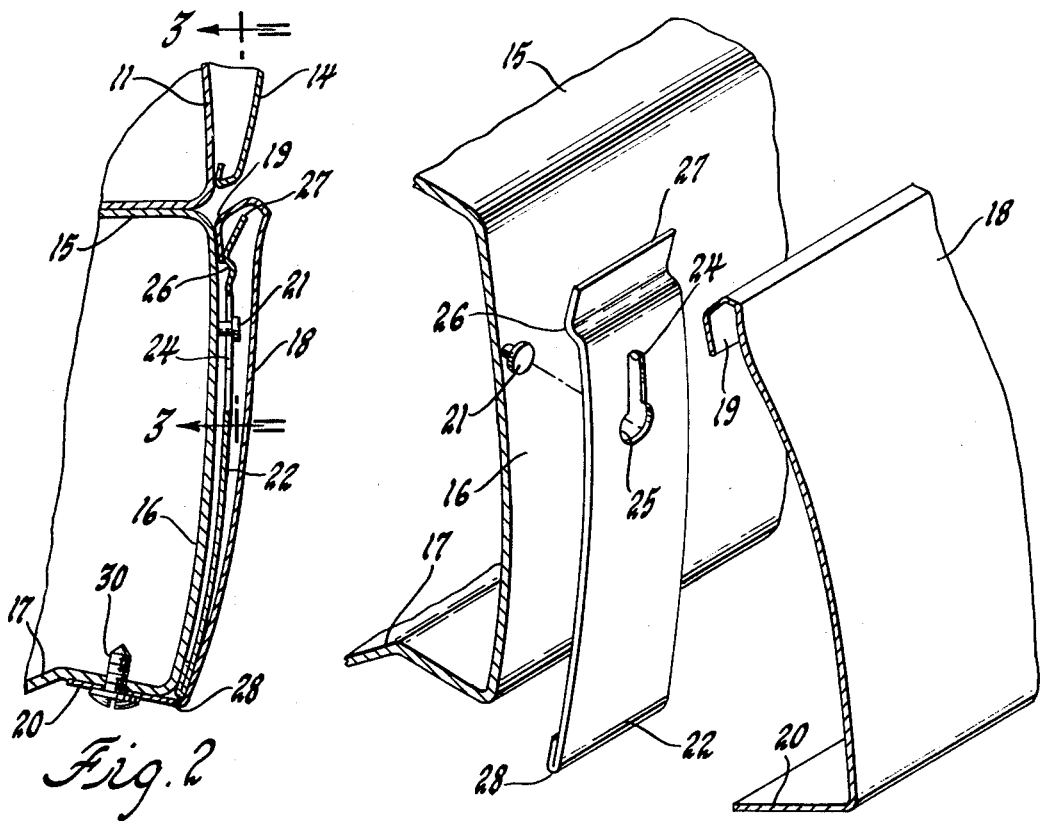
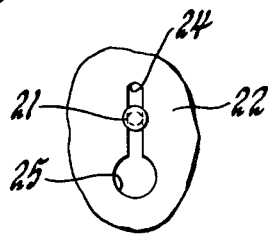
INVENTOR.
Charles W. Rantala
BY
Paul Fitzpatrick
ATTORNEY

ROCKER-MOLDING INSTALLATION

My invention is directed to improvements in automobile bodies and particularly to improved arrangements for securing protective or ornamental moldings to the body. More specifically, my invention is directed to the mounting of a rocker molding in a location in which moldings or other projections of the body may create interference with usual modes of attachment of such rocker moldings.

It is quite usual practice to provide a metal molding along the rocker panel of an automobile, which is the extreme lower portion of the exterior of the vehicle between the wheels, to protect the rocker panel against gravel and the like and also to improve its appearance. For similar reasons, it is also customary to provide moldings along the lower edge of the body and door or doors of the car which are immediately above the rocker panel. In the usual mode of manufacture of vehicles, the body including the quarter lower molding is completed by the body manufacturer and then delivered to the car manufacturer by which the rocker panel molding is fitted. If some part of the body such as a molding along the lower edge of the body or other projection of the body panels extends over the upper edge of the rocker panel, the usual method of mounting the rocker molding on fixed clips proves unsatisfactory or impossible. According to my invention, the mounting clips for the rocker molding are shiftable downward to provide for insertion of the molding and thereafter are moved upward to put the molding in the desired vertical position and the molding is then fixed in place.

The principal objects of my invention are to improve the appearance of vehicle bodies and to facilitate the assembly of vehicle bodies including rocker moldings. A further object is to provide a convenient and sightly mode of mounting a molding on a vehicle body.

Further objects and advantages of my invention and the nature of the invention will be clear to those skilled in the art from the succeeding detailed description of the preferred embodiment of the invention and the accompanying drawings thereof.

FIG. 1 is an axonometric view of an automobile viewed from the right rear quarter.

FIG. 2 is a fragmentary sectional view taken on the plane indicated by the line 2-2 in FIG. 1.

FIG. 3 is a fragmentary view taken on the plane indicated by the line 3-3 in FIG. 2.

FIG. 4 is a fragmentary exploded axonometric view of the rocker-molding installation.

Referring first to FIG. 1, an automobile 6 includes a body 7 and rear wheels 8. The body, which may be of standard construction, includes a door 10 and a rear quarter panel 11. Lower edge trim moldings 12 and 14 are mounted at the lower edge of the door 10 and rear quarter panel 11, respectively. The body includes a rocker panel 15 which is the longitudinal side frame of the body extending along the bottom of the body below the door 10. The rocker panel includes a rocker outer panel 16, the outer face of which extends as the lowest portion of the visible part of the body side and which has a lower face indicated at 17.

Particularly where the lower portion of the body converges inwardly, it is desirable to protect it by a rocker molding each of which, preferably, is a single piece extending from end-to-end of the lower edge of the body between the wheel openings. This may, of course, be ribbed or otherwise ornamented folded or extruded piece of metal, the ornamental properties of which are entirely immaterial to the present invention. As illustrated, it is a formed piece of sheet metal 18 having an inwardly directed recurved upper flange 19 and a lower flange 20 which extends under the outer edge portion of the lower face 17 of the rocker panel.

It is, of course, necessary to retain this molding securely by means which are not apparent from the exterior of the body, so as to preserve the desired high quality of appearance.

Conventionally, such moldings are retained by studs such as the headed stud 21, a number of these studs being projection-welded or otherwise fixed to the outer surface of the rocker panel, normally in a horizontal row along the rocker panel. A molding clip 22 cooperates with each stud 21 to hold the molding 18 against the rocker panel. Clip 22 is a strip of steel or similar material having an upwardly and downwardly elongated slot 24 with an entry hole 25 so that the clip can be slipped over the head of the stud 21 and thereafter is retained by engagement of the head with the margins of slot 24, the slot providing for vertical adjustment of the clip. The clip 22 includes a rib 26 which extends toward the face of the rocker panel, and terminates in an upper edge 27. The lower edge at 28 preferably is reinforced by being folded back.

The rebent upper flange 19 of the molding 18 fits over the upper edge 27 of the clip and is retained between the rib 26 and the face of the rocker panel, the clip 22 being sufficiently springy and being slightly sprung outward so that the retention of the molding against the face of the rocker panel is rattle free. In the normal position of the molding and clip illustrated particularly in FIG. 2, there would be interference from the molding 14 in fitting the rocker molding 18 in place. However, according to my invention, the clips 22 may drop down so that the stud 21 is contained in the top of the slot 24, thereby providing extra clearance for mounting of the rocker panel molding. At this position, of course, the lower edge 28 of the clip extends below the lower face 17 of the rocker panel and likewise the flange 20 of the molding is spaced from the lower face of the rocker panel.

Once the rocker molding has been hung in place on the clips which in turn are hanging on the studs 21, the lower edge of the rocker molding is pushed inwardly and upwardly to the position shown in FIGS. 1 and 2, in which the clip 22 is also moved upwardly by engagement of the lower edge 28 with the flange 20 of the rocker molding. The retention is completed by fitting of a suitable positive retainer such as a screw 30 which may be a self-tapping screw, screws 30 being provided at several points along the molding. Screws 30 are out of sight and do not impair the appearance of the installation. If it should be desired to remove the molding, the screws 30 may be removed and the clips and moldings dropped downwardly to allow the molding to be removed from the clips.

It will be seen that my invention makes it possible to readily install the rocker moldings after the body, including the lower edge moldings, has been completed or, for that matter, after it has been assembled on the automobile chassis.

The detailed description of the preferred embodiment of my invention for the purpose of explaining the principle thereof is not to be considered as limiting or restricting the invention as many modifications may be made by the exercise of skill in the art.

I claim:

1. A vehicle body and molding installation comprising, in combination, a body panel having an outer face and a lower face, a vehicle body portion lying immediately above the body panel and projecting outwardly beyond the body panel, a molding covering the outer face of the body panel and having a lower flange extending under the lower face, a plural number of molding clips mounted on the body panel, means connecting each clip to the body providing for freedom for limited up-and-down movement of the clip on the panel, the molding having an inwardly rebent upper edge flange received between the upper edge of the clips and the outer face so as to retain the upper edge of the molding, the molding lower flange engaging the lower edge of the clips, and means securing the lower edge flange to the body panel so as to hold the molding against both the outer face and the lower face of the body panel and thus locate the molding in the vertical direction while allowing clearance for entry or removal of the rebent upper flange between the body portion and the upper edge of the clips when the securing means is unattached.

2. An installation as recited in claim 1 in which the body panel is a rocker panel and the molding is a rocker molding.

3. An installation as recited in claim 2 in which the body portion is a lower edge molding.

4. A vehicle body and rocker-molding installation comprising, in combination, a rocker panel having an outer face and a lower face, a vehicle body portion lying immediately above the rocker panel and projecting outwardly beyond the rocker panel, a molding covering the outer face of the rocker panel and having a lower flange extending under the lower face, headed studs extending from the outer face of the rocker panel, a clip mounted on each stud and having an upwardly elongated slot with edges engaging behind the head of the stud to retain the clip against the outer face, the molding having an inwardly rebent upper edge flange received between the upper edge of the clips and the outer face so as to retain the upper edge of the molding, the molding lower flange engaging the lower edge of the clips, and means securing the lower edge flange to the rocker panel so as to hold the molding against both the outer face and the lower face of the rocker panel and thus locate the molding in the vertical direction while allowing clearance for entry or removal of the rebent upper flange between the body portion and the upper edge of the clips when the securing means is unattached.